United States Patent [19]

Beig

[11] 4,455,885
[45] Jun. 26, 1984

[54] ROTATION REVERSING SWITCH FOR MOTOR VEHICLE GEAR UNITS

[75] Inventor: Willy Beig, Friedrichshafen, Fed. Rep. of Germany

[73] Assignee: Zahnradfabrik Friedrichshafen Aktiengesellschaft, Fed. Rep. of Germany

[21] Appl. No.: 358,625

[22] Filed: Mar. 16, 1982

[30] Foreign Application Priority Data

Apr. 16, 1981 [DE] Fed. Rep. of Germany ... 8111524[U]

[51] Int. Cl.³ ............... G05G 5/10; H01H 9/06; H01H 9/22
[52] U.S. Cl. ............... 74/477; 74/365; 74/473 SW; 74/475; 74/476; 200/61.88
[58] Field of Search ............... 74/365, 473 SW, 475, 74/476, 477, 878; 192/0.098; 200/61.88

[56] References Cited

U.S. PATENT DOCUMENTS 2,388,357 11/1945 Hewitt ............... 192/0.098
3,894,443 7/1975 Beig et al. ............... 74/878 X
4,067,423 1/1978 Schneider et al. ............... 74/878 X
4,334,130 6/1982 Beig ............... 200/61.54
4,360,718 11/1982 Schobinger et al. ............... 200/61.88

FOREIGN PATENT DOCUMENTS 1804125 4/1970 Fed. Rep. of Germany .
2502578 7/1976 Fed. Rep. of Germany .

Primary Examiner—Allan D. Herrmann
Attorney, Agent, or Firm—Hayes, Davis & Soloway

[57] ABSTRACT

A gear selector for a motor vehicle has a gear shift lever which is rotatable about its longitudinal axis to activate micro switches that select the desired gear ratio and is rotatable in the plane of its longitudinal axis about a pivot mounted to the steering column to activate micro switches for effecting forward or reverse movement of the vehicle. The gear selector contains a lockout device that prevents movement of the gear selector between the forward and reverse positions when the vehicle is operating in one of the higher gears.

4 Claims, 3 Drawing Figures

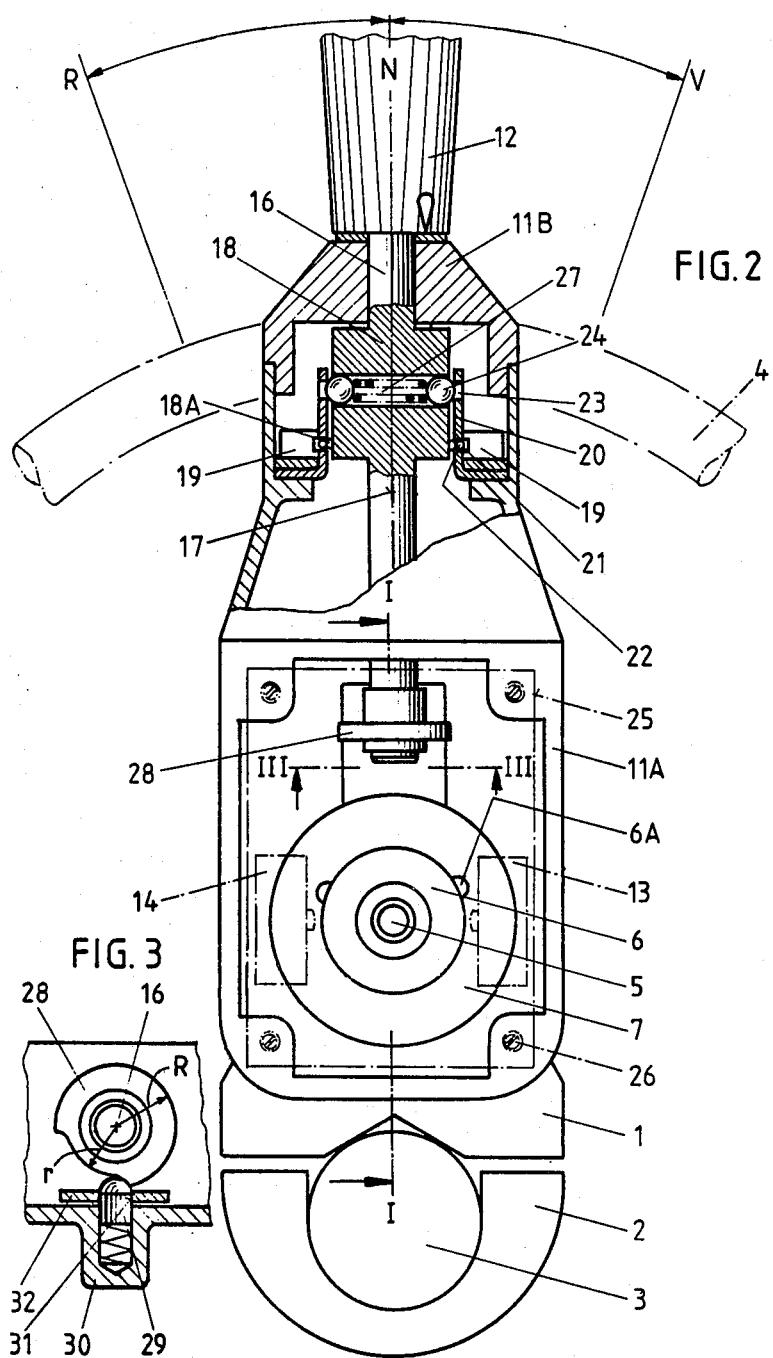

ROTATION REVERSING SWITCH FOR MOTOR VEHICLE GEAR UNITS

The invention relates to a gear switch or selector for motor vehicle gear units, in particular a steering wheel switch for construction machine gear units, comprising several gears which can be shifted for forward and reverse travel.

BACKGROUND OF THE INVENTION

A gear switch of this type is known from DT-PS 25 02 578. This gear switch comprises a shift lever mobile in two parallel links. The two links finish in a switch track perpendicular to the links, in which the shift lever can be moved, by slightly lifting and then lowering it into the position for forward or reverse travel. When this gear switch is fixed to the steering column, it is not clear to the eye of the driver whether the shift lever has assumed the forward or reverse travel position. When the number of gears is large, the shift lever has a large angle of swing. The shift lever and drum controller for controlling the gears are connected together by means of an elastic hinge. This prejudices the accuracy of the instant of switching both for the gear change and for the change in the direction of travel.

German laid-open specification No. 18 04 125 describes a manoeuvring device for a change-over and reversing gear for construction vehicles, which comprises a gear shift lever which is rotatable about its longitudinal axis and can be swivelled about an axis perpendicular to this latter. It is supported in a ball-and-socket joint, and is connected, by way of the end distant from the handgrip, to a mechanical linkage for switching-in the reversing gear. The known gear switch requires high shifting forces, and is not suitable as a steering wheel switch for construction vehicles with their frequent changes in the direction of travel. The robust support for the shift lever, required because of the high shifting forces, is also unsuitable for the use of microswitches.

The object was therefore to provide an easily operable gear switch, in which the contact travel distance involved in controlling the gears is small, in which when the gear switch is viewed in plan the positions for forward and reverse travel are clearly recognisable, and which allows the switching instants to be made precise.

This object was attained by the invention described in patent application DE-OS No. 29 34 473.

SUMMARY OF THE INVENTION

The present invention provides a further development of the rotation reversing switch described in the latter specification, in which a locking device is provided which acts such that it is possible to change the direction of travel by swivelling the gear shift lever only when in particular gears, and principally in the lower gears.

BRIEF DESCRIPTION OF THE DRAWINGS

One embodiment of the invention is shown in further detail in the drawing, in wich:

FIG. 2 is a plan view with the casing cover and printed circuit board removed, and shown partly in section through the tube-shaped part of the casing.

FIG. 3 is a section on the line III—III of FIG. 2.

In FIGS. 1 and 2, the reference numeral 1 represents a support, by which the gear switch is attached to the steering column 3 with the aid of a U piece 2. The steering wheel 4 is shown by dashed and dotted lines. A pivot 5 is rigidly connected to support 1. A box-shaped casing portion 11A of the gear change lever is supported on the pivot so that it can rotate about the latter. The casing portion 11A merges into a tube-shaped outer portion 11B, in which a rotary switch grip 12 is supported for rotation about its longitudinal axis 17 by means of a pivot 16.

DESCRIPTION OF THE PREFERRED EMBODIMENT

Figure 1:
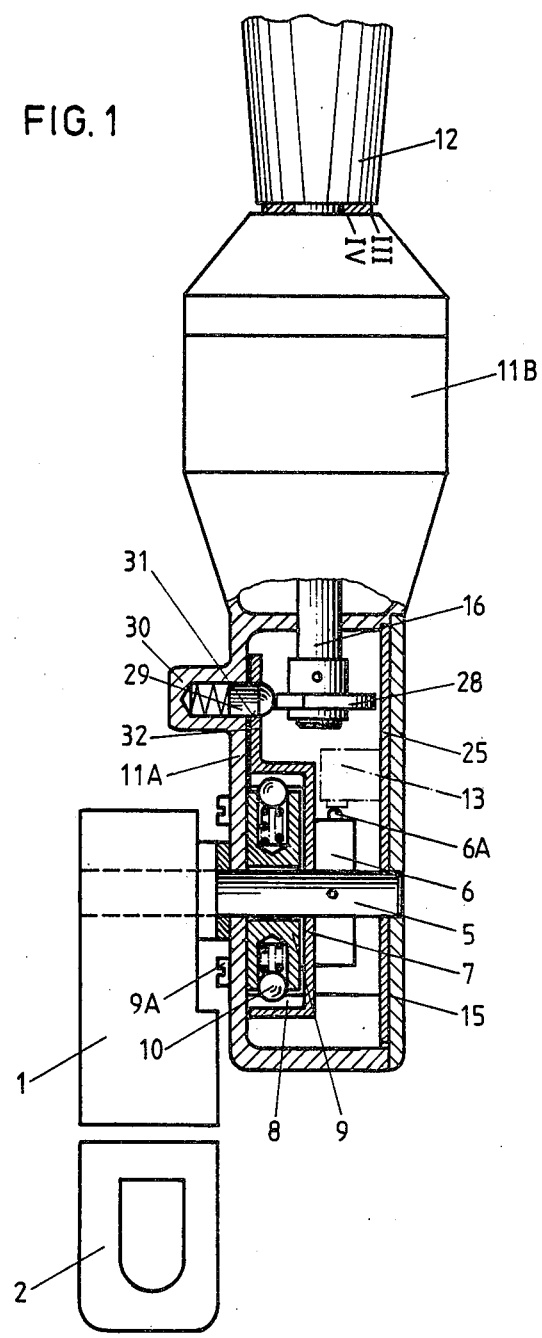
FIG. 1 is a side view, shown partly in section on the line I—I of FIG. 2, and with one of the change-over switches drawn displaced through 90°.

The pivot 5 is rigidly connected to a cam disc 6 and to a cap member 7 provided with depressions 8. In the interior of the cap member there is situated a clic-stop disc 9, which is fixed to the housing portion 11A by means of screws 9A. Spring-loaded balls 10 engage in the depressions 8, and secure the gear shift lever in the three swivel positions for neutral N, forward travel V and reverse travel R.

The rotary switch grip 12 is provided with a drum controller 18, which has switching cams 18A on its periphery. The drum controller is surrounded by a locating plate 20, which is fixed to the outer portion 11B of the casing. In a circle around the drum controller, there are disposed a plurality of microswitches 19 by which the control currents for the individual gears are switched. Opposite the microswitch operating pin, which does not carry a reference numeral, the locating plate is provided with holes 21, in which the switching balls 22 are inserted. These are urged radially outwards by means of the switching cams 18A, and operate the respective microswitch pertaining to the gear chosen by rotating the rotary switch grip.

The locating plate 20 comprises a plurality of recesses 23 disposed opposite each other in pairs, which engage click-stop balls 24 fitted under spring-loaded conditions in a bore 30 of the drum controller. By this means, the individual positions of the rotary switch grip 12 are defined.

A printed circuit board 25, shown in outline in FIG. 2, is fixed to the casing portion 11A by screws 26. The printed circuit board carries two changeover switches 13 and 14 (FIG.2), which move round when the gear shift lever is swivelled outwards from the neutral position N into the forward travel position V or reverse travel position R about the fixed cam disc 6, and are thus alternately operated by the cams 6A. In FIG. 1, one of the change-over switches with its associated cam is shown displaced through 90°. The printed circuit board contains connection points, not shown, for wiring the change-over switches and microswitches. A cover 15 (FIG. 1) closes the casing portion 11A upwards.

To the end of the pivot 16 there is fixed a locking disc 28 (FIGS. 1 and 3) which rotates together with the rotary switch grip 12, and can be rotated about pivot 5 as well as about axis 17. The peripheral surface of the locking disc is constructed with radii R and r of different sizes, and engages with a locking bolt 29 with a rounded end. The locking bolt is spring-loaded inside a sleeve-shaped portion 30 of the casing portion 11A, and when the gear shift lever is in the neutral position N (FIG. 2), it passes through the bore 31 in a plate 32 fixed to the stationary cap member 7.

In the drawing, the locking bolt 29 lies under spring-loaded conditions against the peripheral portion r associated with the higher gears of the gear unit which is to be shifted. Any swivelling of the gear shift lever about the pivot 5 and thus any change in the direction of travel is prevented by the locking bolt 29 which lies in the bore of the plate 32.

When the rotary switch grip 12 is in the positions corresponding to the lower gears, and the gear shift lever 11, 12 is in the neutral position N, the locking bolt is pressed inwards by means of the peripheral portion R of the locking disc 28, so that the locking bolt lies only with a part of its rounded end still in the plate 32. On swivelling the gear shift lever out of the neutral position, the locking bolt becomes completely pressed into the sleeve 30, and the gear shift lever can be swivelled into the forward or reverse position.

I claim:

1. A gear selector for a motor vehicle comprising:
a support; a gear shift lever mounted for rotation about two axes, one perpendicular to the other and one of which is the longitudinal axis of said gear shift lever; a drum controller rotatable about said longitudinal axis by said gear shift lever and having at least two gear ratio switches adapted to be selectively operated by said drum controller when said drum controller is rotated, said micro switches each determining a gear position of said motor vehicle to give a pre-determined gear ratio; a pivot defining the second of said axes and being affixed to said support; a forward-reverse selecting means supported by said pivot and rotatable thereabout by said gearshift lever, said forward-reverse selecting means having (i) a casing with a cam, said casing having an inner wall and being rigidly fixed to said pivot, (ii) a cylinder within said casing rotatable by said gear shift lever about said pivot, (iii) a first position arresting means arresting the positions of said casing relative to said cylinder in pre-determined positions corresponding to forward, neutral and reverse of said motor vehicle and (iv) two forward-reverse switches corresponding to the forward and reverse positions adapted to be alternately activated by said cam and rotatable in unison with said cylinder about pivot by said gear shift lever; and a locking means having (i) a locking disc rotatable about said longitudinal axis by said gear shift lever, its circumference having a larger radius portion and a smaller radius portion, the position of said large radius portion being determined by the position of said gear shift lever that selects the lower gear ratios and position of the small radius portion being determined by the position of said gear shift lever that selects the higher gear ratio and (ii) a second position arresting means operating against said large and small radius portions and preventing in conjunction therewith and with said casing the operating of said forward-reversing selecting means when said gear shift lever is in a position wherein a higher gear ratio has been selected but permitting the operating of said forward-reverse selecting means when said gear shift is in a position wherein a lower gear ratio has been selected.

2. The gear selector of claim 1 comprising in addition a housing containing said drum controller, pivot, forward-reverse selecting means and locking means, and supporting said gear shift lever for rotation about said longitudinal axis and being rotatable by said gear shift lever along with said forward-reverse selecting means about said pivot.

3. The gear selector of claim 2 wherein said first position arresting means comprises two first spring loaded detents carried by said cylinder and mating sockets therefor in said casing inner wall and wherein said second position arresting means comprises a second spring loaded detent carried by said housing and operating through a matching opening in said casing against the circumference of said locking device, said second spring loaded detent being pushed into the recessed position permitting movement of said casing when in contact with said larger radius portion of said locking disc.

4. The gear selector of claim 3 wherein said support is adapted to be affixed to a steering column of a motor vehicle.

* * * * *